United States Patent [19]
Copeland

[11] 3,847,239
[45] Nov. 12, 1974

[54] STEERING MECHANISM FOR SELF-PROPELLED VEHICLES

[76] Inventor: Claud L. Copeland, 13868 Knox, Warren, Mich. 48089

[22] Filed: May 8, 1972

[21] Appl. No.: 250,950

[52] U.S. Cl. .............................. 180/5 R, 280/21 R
[51] Int. Cl. ............................................. B62m 27/02
[58] Field of Search ................................. 180/3–6; 280/21 R, 95 R

[56] References Cited
UNITED STATES PATENTS

| | | | |
|---|---|---|---|
| 2,905,479 | 9/1959 | Schomers | 180/3 |
| 3,650,341 | 3/1972 | Asmussen | 180/5 R |
| 3,731,755 | 5/1973 | Dretzka | 180/5 R |

*Primary Examiner*—Philip Goodman
*Assistant Examiner*—John A. Carroll
*Attorney, Agent, or Firm*—A. F. Baillio

[57] ABSTRACT

A steering mechanism for self-propelled vehicles in which when the wheels, skis or other supports by which the vehicle is steered are turned they are also moved toward the outside of the curved path into which the vehicle is put when the supports are turned so that the outer support serves as an outrigger to reduce the tendency of the vehicle to overturn at higher speeds.

9 Claims, 8 Drawing Figures

3,847,239

STEERING MECHANISM FOR SELF-PROPELLED VEHICLES

BACKGROUND OF INVENTION

This invention relates to self-propelled vehicles with wheels, skis or other supports which may be turned to steer the vehicle and, more especially, as I see it at present, to snowmobiles equipped with steering skis. Vehicles of this type have an increasing tendency when traveling on a curved path at higher speeds to overturn toward the outside of the curved path.

SUMMARY OF INVENTION

The object of the invention is to provide a steering mechanism for such vehicles which reduces their tendency to overturn while traveling on a curved path at higher speeds. In the preferred embodiment of the invention, this is accomplished by mounting the wheels or skis or whatnot so that as they are turned to put the vehicle on a curved path they move toward the outside of the curved path and the outer support acts as a sort of an outrigger and thus reduces the tendency of the vehicle to overturn.

For a better understanding of the nature of the invention and a disclosure of preferred embodiments thereof, reference is made to the accompanying drawing and the following description:

DESCRIPTION OF PREFERRED EMBODIMENT

Figure 1:
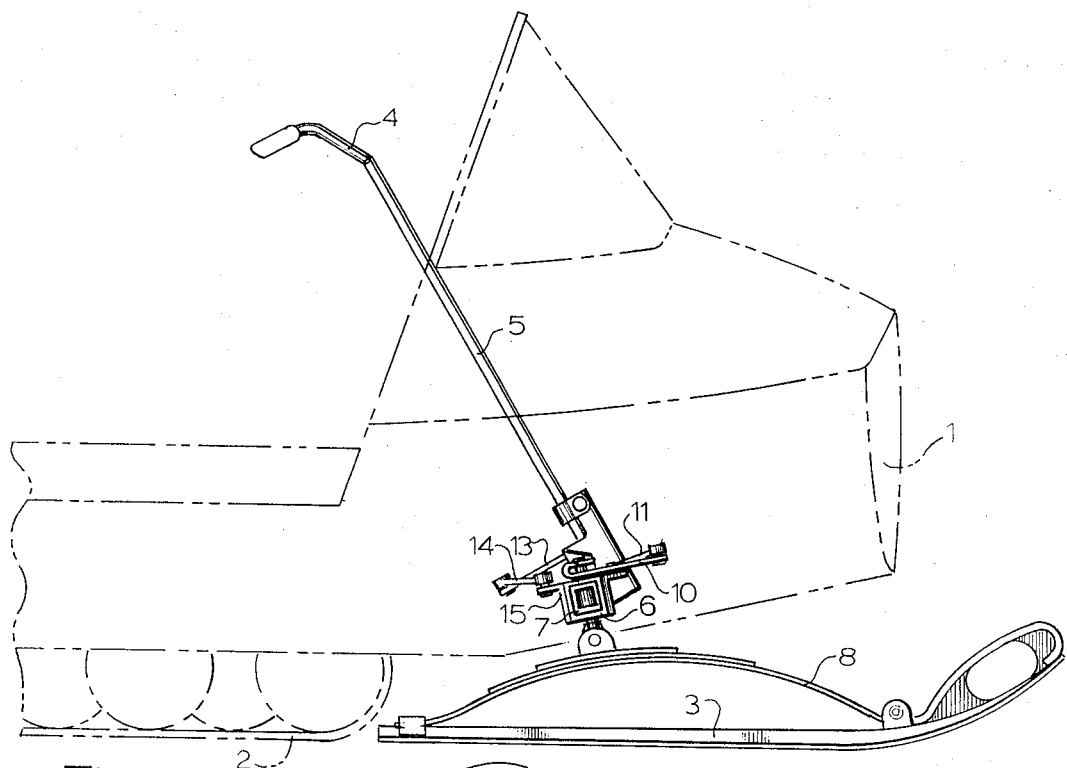
FIG. 1 is a side elevation of a snowmobile equipped with a steering mechanism in accordance with my invention.
Figure 2:
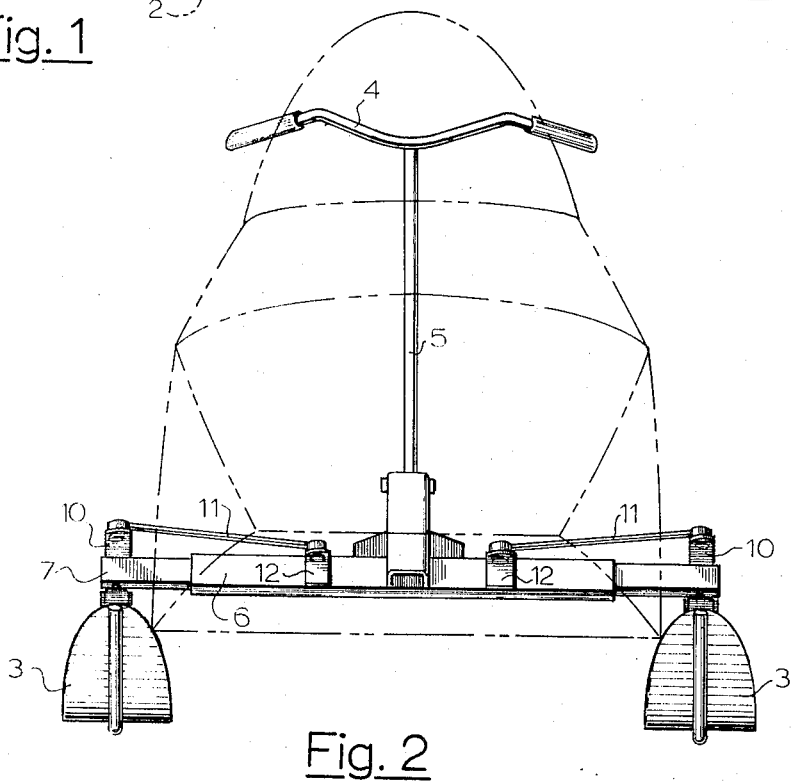
FIG. 2 is a front elevation of the snowmobile shown in FIG. 1.
Figure 3:
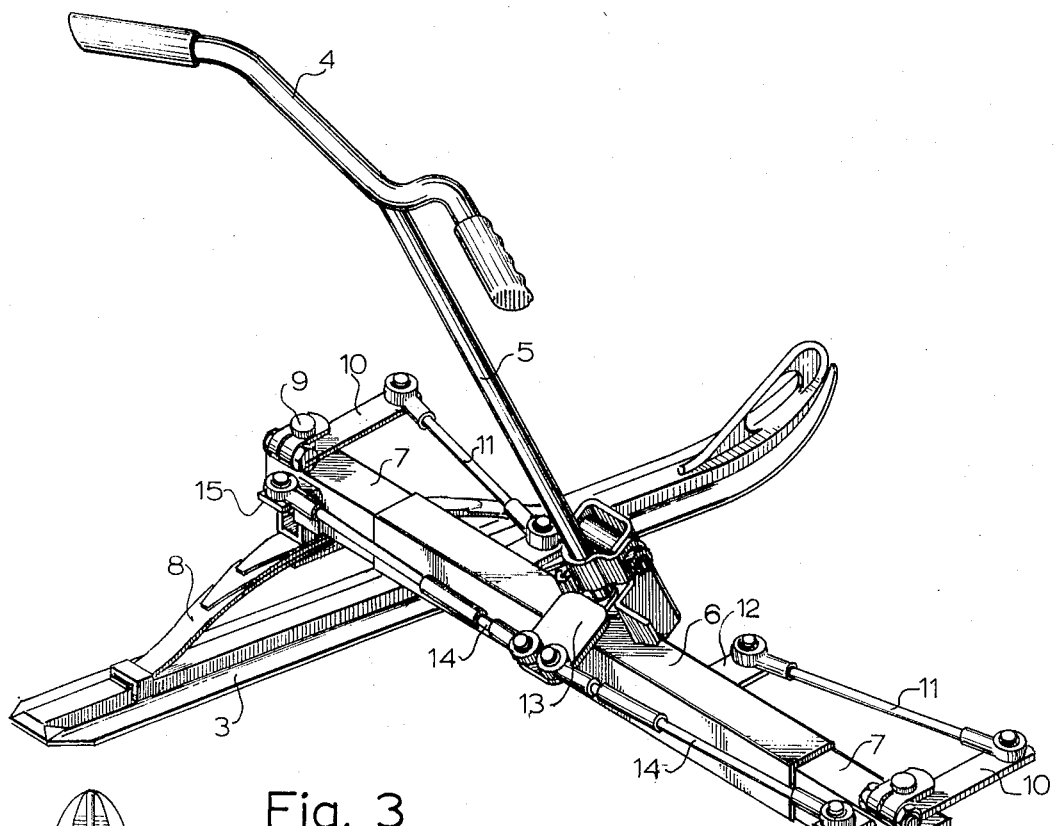
FIG. 3 is a perspective view of the steering mechanism of the vehicle shown in FIGS. 1 and 2, including the skis.

The vehicle shown in the drawing includes a body 1 supported by a propelling track 2 and steering skis 3. The track is driven by an engine (not shown) and the skis are angularly movable by handlebars 4 and a steering shaft 5 to control the direction of travel of the vehicle.

Formed in or rigidly attached to the body of the vehicle is a square tubular housing 6 which extends crosswise of the body and mounted to slide snugly rectilinearly in the housing 6 is a smaller square tubular bar 7. The body 1 is mounted on the skis through the media of springs 8 which are attached to the skis and pins 9 which are attached to the springs and mounted in the bar 7 near its ends to turn about substantially vertical axes so that the skis may be turned to steer the vehicle.

In the embodiment of the invention shown in FIGS. 1 to 3 and 6 to 8, there is fixed to each of the pins 9 an arm 10 which is connected by a link 11 to an ear 12 on the housing 6. To turn the pins 9, and thus the skis to steer the vehicle there is fixed to the lower end of the steering shaft an arm 13. The arm 13 is connected by links 14 to ears 15 on the bar 7 near its ends. Consequently, when the handlebars 4 are turned the bar 7 slides toward one side of the vehicle and the skis are turned toward the other side of the vehicle because the links 11 prevent the outer ends of the arms 10 from moving substantially laterally and, therefore, the pins 9 turn relatively to the bar 7 as it slides. The movement of the bar in the direction opposite that in which the skis are turned causes the outer ski to move bodily outwardly on curves and thus serve as an outrigger to reduce any tendency of the vehicle to overturn.

Figure 4:
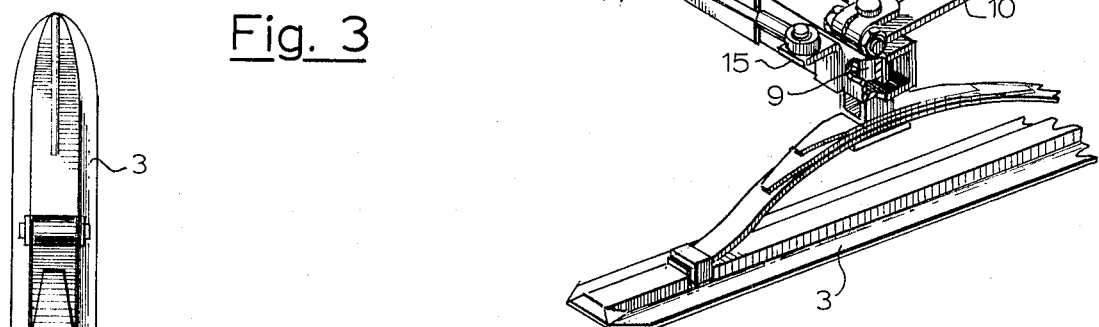
FIGS. 4 and 5 are fragmentary plan views of modifications of the steering mechanism shown in FIG. 3.

As shown in FIG. 4, the inner ends of the links 11 may, instead of being connected to the housing through the ears 12, be connected to the arm 13 on the lower end of the steering shaft 5. This would increase the outward movement of the skis 3 for a given angular movement and also reduce the angular movement of the skis for a given angular movement of the steering shaft 5 and thus reduce any tendency to oversteer if the connection were made to the arm 13 on the same side of the steering shaft 5 as the inner ends of the links 14. If the connection were made to the arm on the other side of the shaft, it would reduce the outward movement of the skis for a given angular movement and also increase the angular movement of the skis for a given angular movement of the steering shaft and thus reduce any tendency to understeer.

Figure 5:
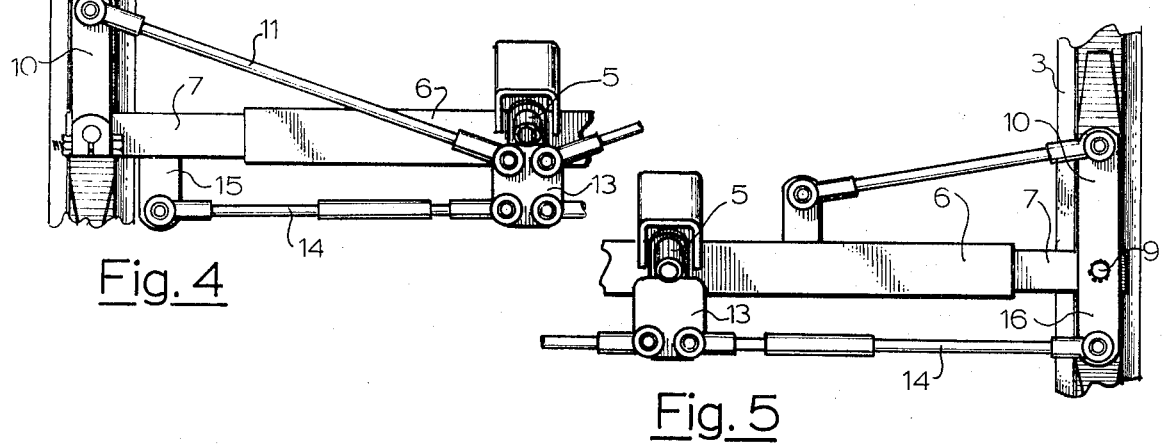
Figure 6:
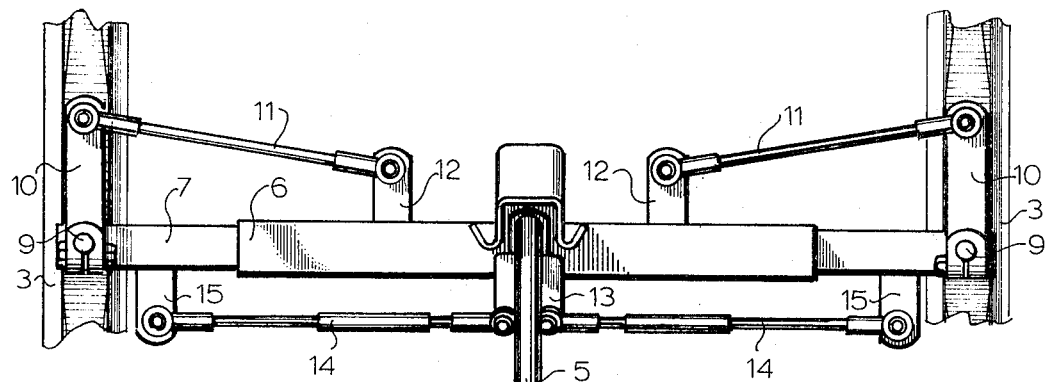
FIGS. 6, 7 and 8 are plan views of the steering mechanism shown in FIG. 3 with the mechanism in straight ahead, right turn and left turn positions, respectively.
Figure 7:
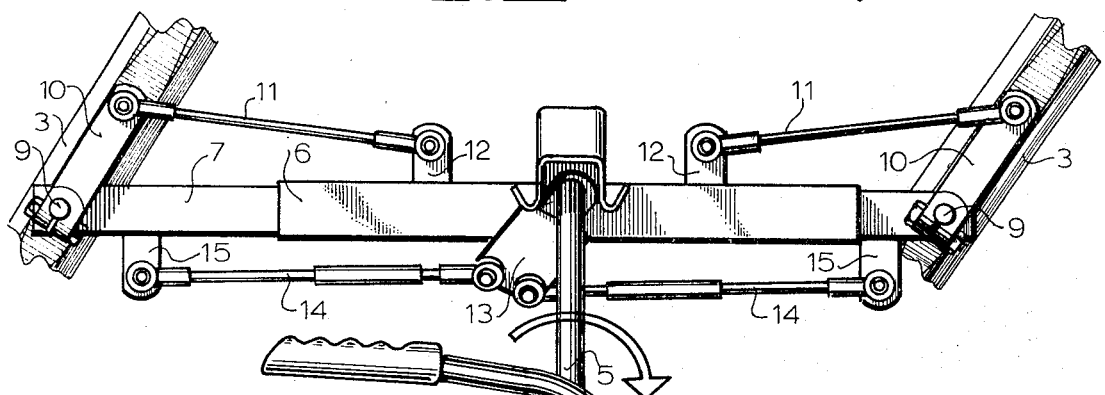
Figure 8:
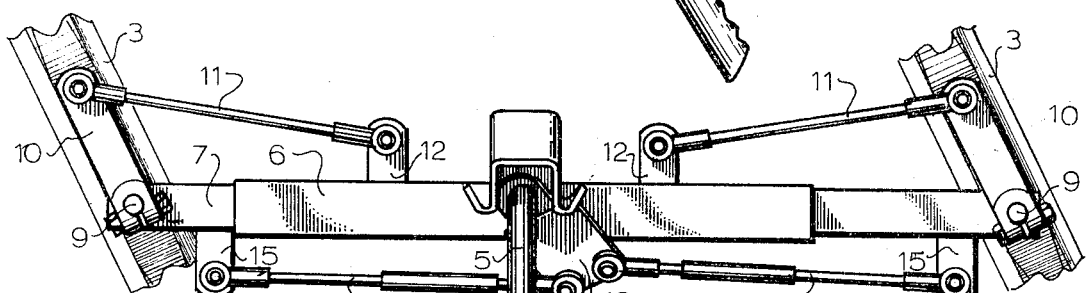

Also, as shown in FIG. 5, the outer ends of the links 14 may, instead of being connected to the bar 7 through the ears 15, be connected to it through arms 16 which extend away from the pins 9 in the direction opposite the arms 10. This would not affect the ratio of the outward movement of the skis 3 to the angular movement but would reduce the angular movement of the skis for a given angular movement of the steering shaft 5 and thus reduce any tendency to oversteer.

I claim:

1. In a self-propelled vehicle, a body, a support for the body, means for mounting the support on the body so that it may be turned to steer the vehicle and moved rectilinearly crosswise of the vehicle, and means for turning the support to steer the vehicle in one direction and moving the support bodily in the other direction crosswise of the vehicle when it is turned in the first direction.

2. The invention claimed in claim 1 in which the means for mounting the support on the vehicle includes a member which is movable rectilinearly crosswise of the vehicle and a member attached to the support and mounted to turn on the first-mentioned member.

3. The invention claimed in claim 1 in which the means for mounting the support on the vehicle includes a member which is movable rectilinearly crosswise of the vehicle and a member attached to the support and mounted to turn on the first-mentioned member and the means for turning and moving the support includes a rotatable shaft, an arm on the shaft, an arm on the member attached to the support, a link which connects the arm on the rotatable shaft to the member which is movable crosswise of the vehicle, and another link which connects to the body the arm on the member attached to the support.

4. The invention claimed in claim 1 in which the means for mounting the support on the vehicle includes a bar which is slidable rectilinearly crosswise of the vehicle and a member attached to the support and mounted to turn on the bar.

5. In a self-propelled vehicle, a body, a support for the body on each side of the body, means for mounting the supports on the body so that they may be turned to steer the vehicle and moved rectilinearly crosswise of the vehicle including a member which is movable rectilinearly crosswise of the vehicle and a member attached to each of the supports and mounted to turn on the first-mentioned member, and means for turning the supports to steer the vehicle in one direction and moving the supports bodily in the other direction rectilinearly crosswise of the vehicle when they are turned in the first direction, including a rotatable shaft, an arm on the shaft, an arm on each of the members attached to the supports, a link which connects the arm on the rotatable shaft to the member which is movable crosswise of the vehicle, and another link which connects to the body each of the arms on the members attached to the support.

6. In a self-propelled vehicle, a body, a support for the body, means for mounting the support on the body so that it may be turned to steer the vehicle and moved rectilinearly crosswise of the vehicle, including a bar which is movable rectilinearly crosswise of the vehicle and a pin attached to the support and mounted to turn on the bar, and means for turning and moving the support which includes a rotatable shaft, an arm on the rotatable shaft, an arm on the pin, a link which connects the arm on the rotatable shaft to the bar, and another link which connects the second-mentioned arm to the body through the first-mentioned arm.

7. In a self-propelled vehicle, a body, a support for the body on each side of the body, means for mounting the supports on the body so that they may be turned to steer the vehicle and moved rectilinearly crosswise of the vehicle, including a bar which is movable rectilinearly crosswise of the vehicle and a pin attached to each of the supports and mounted to turn on the bar, and means for turning the supports to steer the vehicle in one direction and moving the supports in the other direction rectilinearly crosswise of the vehicle when they are turned in the first direction, including a rotatable shaft, an arm on the rotatable shaft, an arm on each of the pins, a link which connects the arm on the rotatable shaft to the bar, and another link which connects each of the arms on the pins to the body through the arm on the rotatable shaft.

8. In a self-propelled vehicle, a body, a support for the body, means for mounting the support on the body so that it may be turned to steer the vehicle and moved rectilinearly crosswise of the vehicle, including a bar which is movable rectilinearly crosswise of the vehicle and a pin attached to the support and mounted to turn on the bar, and means for turning and moving the support which includes a rotatable shaft, an arm on the rotatable shaft, an arm on the pin, a link which connects the arm on the rotatable shaft to the bar, another link which connects the arm on the pin to the body, and another arm on the pin through which the first-mentioned link connects the arm on the rotatable shaft to the bar.

9. In a self-propelled vehicle, a body, a support for the body on each side of the body, means for mounting the supports on the body so that they may be turned to steer the vehicle and moved rectilinearly crosswise of the vehicle, including a bar which is movable rectilinearly crosswise of the vehicle and a pin attached to each of the supports and mounted to turn on the bar, and means for turning the supports to steer the vehicle in one direction and moving the supports in the other direction rectilinearly crosswise of the vehicle when they are turned in the first direction, including a rotatable shaft, an arm on the rotatable shaft, an arm on each of the pins, links which connect each of the arms on the pins to the body, and another arm on each of the pins through which the first-mentioned links connect the arm on the rotatable shaft to the bar.

* * * * *